(12) United States Patent
Sasaki

(10) Patent No.: US 7,031,023 B2
(45) Date of Patent: Apr. 18, 2006

(54) COLOR PRINTER, STORAGE MEDIUM STORING COLOR PRINTER DRIVER PROGRAM, AND COLOR PRINTER DRIVING METHOD

(75) Inventor: Shinobu Sasaki, Shizuoka-ken (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 879 days.

(21) Appl. No.: 09/952,099

(22) Filed: Sep. 14, 2001

(65) Prior Publication Data
US 2002/0036785 A1 Mar. 28, 2002

(30) Foreign Application Priority Data
Sep. 25, 2000 (JP) ............................ 2000-290848

(51) Int. Cl.
*H04N 1/40* (2006.01)
(52) U.S. Cl. .................................... 358/1.9; 358/504
(58) Field of Classification Search ............... 358/1.9, 358/2.1, 406, 500, 502, 504, 515–523
See application file for complete search history.

(56) References Cited

U.S. PATENT DOCUMENTS

| | | | | |
|---|---|---|---|---|
| 5,675,717 A | * | 10/1997 | Yamamoto | .................. 358/1.9 |
| 5,740,279 A | * | 4/1998 | Wang et al. | ................. 382/237 |
| 6,231,161 B1 | * | 5/2001 | Saruta | ......................... 347/43 |

FOREIGN PATENT DOCUMENTS

JP 9-52390 2/1997

* cited by examiner

*Primary Examiner*—Thomas D. Lee
*Assistant Examiner*—Stephen Brinich
(74) *Attorney, Agent, or Firm*—Frishauf, Holtz, Goodman & Chick, P.C.

(57) ABSTRACT

A CPU of a personal computer operates as a driver of a color printer main body in accordance with software processing based on a printer driver program installed in a hard disk unit. Then, in the driver operation, the CPU determines whether or not an application requesting printing carries out application ICM. Further, the CPU causes a printer to execute printer ICM only in the case where the application ICM is set OFF, and the printer ICM is set to ON in consideration of the result of the determining and user setting of ON/OFF of the printer ICM accepted in advance.

5 Claims, 4 Drawing Sheets

COLOR PRINTER, STORAGE MEDIUM STORING COLOR PRINTER DRIVER PROGRAM, AND COLOR PRINTER DRIVING METHOD

CROSS-REFERENCE TO RELATED APPLICATIONS

This application is based upon and claims the benefit of priority from the prior Japanese Patent Application No. 2000-290848, filed Sep. 25, 2000, the entire contents of which are incorporated herein by reference.

BACKGROUND OF THE INVENTION

1. Field of the Invention

The present invention relates to a color printer having a function that carries out color adjustment processing such as ICM (Image Color Matching), a storage medium storing a color printer driver program, and a color printer driving method.

2. Description of the Related Art

In general, a color printer has a function that carries out ICM processing. Whether or not to carry out the ICM processing can be changed according to a user printer driver setting.

On the other hand, an application for making a print request for a printer driver as well has a function that carries out ICM processing in the case where a color image edit function is provided. whether or not to carry out the ICM processing at the application side can be changed according to the user application setting.

The ICM processing in a color printer and the ICM processing in the application are performed completely independently. Therefore, the ICM processing may be repeated, first in the application and again in the color printer. In this case, the image printed is unnatural.

BRIEF SUMMARY OF THE INVENTION

The present invention has been made in order to solve the foregoing problem. An object of the invention is to provide a color printer that carrying out color adjustment processing only when necessary, thereby to print a high-quality image.

According to one aspect of the present invention, there is provided a color printer that prints a color image according to a request from an arbitrary application, the color printer comprising: an adjustment processing section configured to carry out predetermined color adjustment processing for adjusting a print color; an acceptance section configured to accept user setting as to whether the adjustment processing section is activated; a determining section configured to determine whether the application requesting printing should carry out the color adjustment processing; and an adjustment control section configured to activate the adjustment processing section only in the case where it is determined by the determining section that the application does not carry out the color adjustment processing, and user setting for activating the adjustment processing by the acceptance section is accepted, and deactivate the adjustment processing section in the other case.

According to another aspect of the present invention, there is provided a storage medium having stored therein a driver program that causes a computer to execute control processing for printing a color image by a color printer that comprises an adjustment processing section configured to carry out predetermined color adjustment processing for adjusting a print color according to a request from an application achieved by the computer executing an application program, the driver program causes the computer to operate a respective one of: an acceptance section configured to accept user setting as to whether the adjustment processing section is activated; a determining section configured to determine whether the application requesting printing should carry out the color adjustment processing; and an adjustment control section configured to activate the adjustment processing section only in the case where it is determined by the determining section that the application does not carry out the color adjustment processing, and user setting for activating the adjustment processing section is accepted by the acceptance section, and deactivate the adjustment processing section in the other case.

According to a still another aspect of the present invention, there is provided a method for driving a color printer that comprises an adjustment processing section configured to carry out predetermined color adjustment processing for adjusting a print color according to a request from an application achieved by a computer executing an application program, the driving method comprising: accepting user setting as to whether the adjustment processing section is activated; determining whether the application requesting printing should carry out the color adjustment processing, activating the adjustment processing section only in the case where it is determined that the application does not carry out the color adjustment processing, and user setting for activating the adjustment processing or deactivating the adjustment processing section in the other case.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Hereinafter, preferred embodiments of the present invention will be described with reference to the accompanying drawings.

(First Embodiment)

Figure 1:
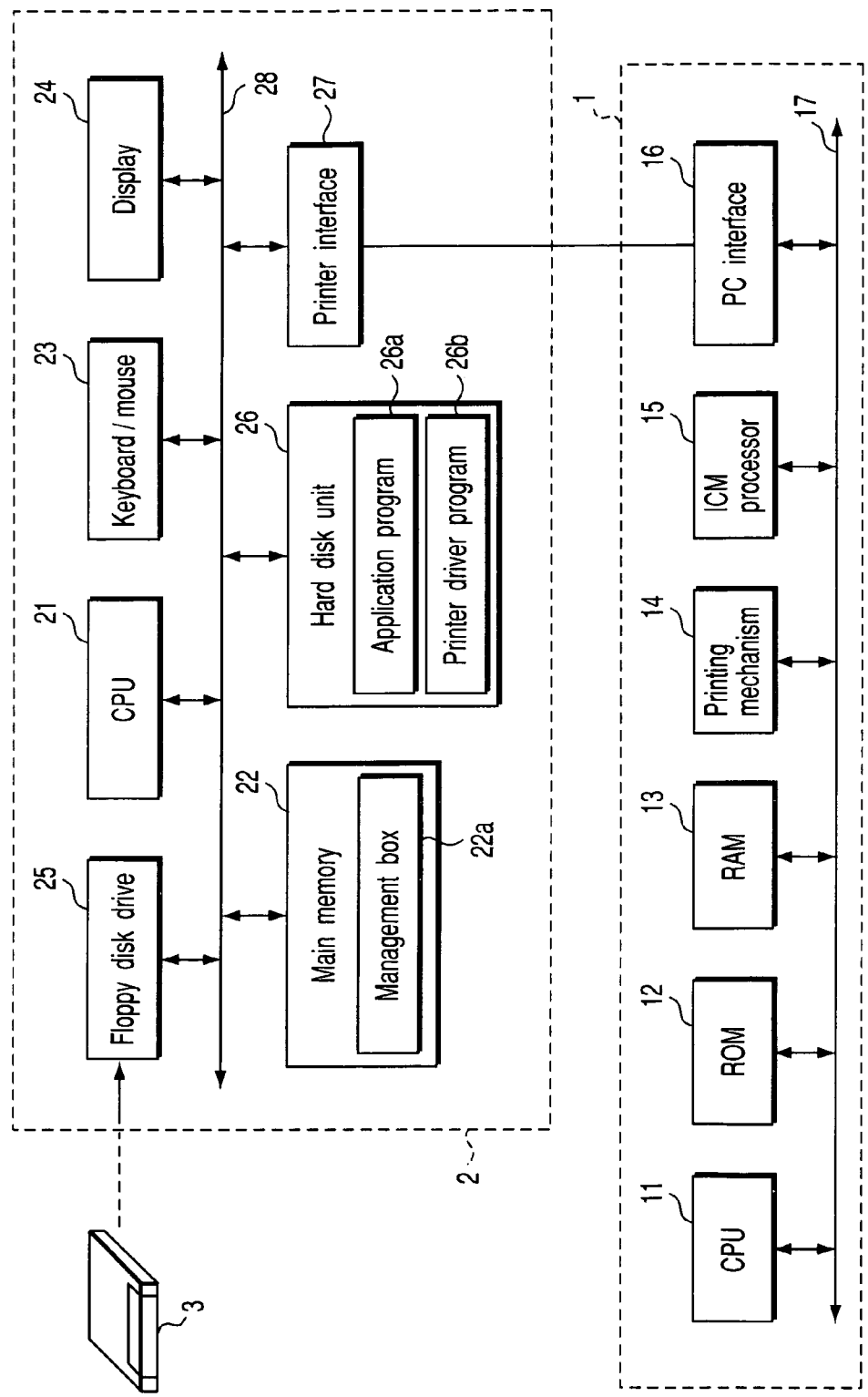
FIG. 1 is a block diagram showing a color printer according to a first embodiment of the present invention.

FIG. 1 is a block diagram showing a color printer according to a first embodiment of the present invention.

FIG. 1, a color printer main body is designated by reference numeral 1. The color printer according to the present embodiment is composed of a color printer main body I and a printer driver provided as described later at a personal computer 2.

The color printer main body 1 comprises a CPU 11, a ROM 12, a RAM 13, a Printing mechanism 14, an ICM processor 15, and a PC interface 16, as shown in FIG. 1. These elements are connected to each other via a bus 17.

The CPU 11 executes software processing based on an operating program stored in the ROM 12, and controls each section of the color printer main body 1 so as to achieve a variety of operations of the color printer.

The ROM 12 stores the operating program and other various items of data.

The RAM 13 temporarily stores various items of data required for the CPU 11 to carry out a variety of processing functions.

The Printing mechanism 14 is a well known hardware mechanism for achieving color printing.

The ICM processor 15 applies ICM processing to print data prior to carrying out color printing at the Printing mechanism 14.

The PC interface 16 exchanges data with the personal computer 2.

On the other hand, the personal computer 2 is an existing general-purpose computer. The personal computer 2 comprises a CPU 21, a main memory 22, a keyboard/mouse 23, a display 24, a floppy disk drive 25, a hard disk unit 26, and a printer interface 27, as shown in FIG. 1. These elements are connected to each other via the bus 28.

The CPU 21 carries out a variety of software processing functions according to a program stored in the hard disk unit 26.

The main memory 22 temporarily stores a program or other data A part of a storage area of the main memory 22 is used as a management box 22a for storing ICM information described later.

The keyboard/mouse 23 accepts a variety of instructive inputs by a user.

The display 24 displays an image for notifying various items of information to the user.

The floppy disk drive 25 reads out data from the floppy disk 3, and writes the data to the floppy disk 3.

The hard disk unit 26 stores an operating system program used by the CPU 21, an application program 26a and a printer driver program 26b, any other arbitrary data.

The printer interface 27 exchanges data with the color printer main body 1.

Now, an operation of the foregoing color printer will be described here. In the foregoing, the CPU 21 making operation based on the application program 26a is referred to as an application. In addition, the CPU 21 making operation based on the printer driver program 26b is referred to as a printer driver.

First, the personal computer 2 is a general-purpose computer, and the printer diver program 26b is not initially installed. Because of this, as part of a work for connecting the color printer to the personal computer 2, a printer driver program stored in the floppy disk 3 packed with or provided separately from the color printer main body 1 is installed in the hard disk unit 26.

This printer driver program 26b causes the CPU 21 to execute operations of the acceptance section, determining section, and adjustment control section, respectively. That is, the CPU 21 operates as a respective one of the acceptance section, determining section, and adjustment control section by carrying out processing based on the printer driver program 26b.

The acceptance section accepts user setting as to whether or not to carry out ICM processing (hereinafter, referred to as printer ICM) by the ICM processor 15 of the color printer main body 1.

In the case where a print request is made from an application to the printer driver, the determining section determines whether or not an application requesting such printing carries out lCM processing (hereinafter, referred to as application ICM).

Then, the adjustment control section controls activation/deactivation of the ICM processor 15 based on the contents of user setting concerning the printer ICM and the determining result whether or not to carry out application ICM.

Figure 2:
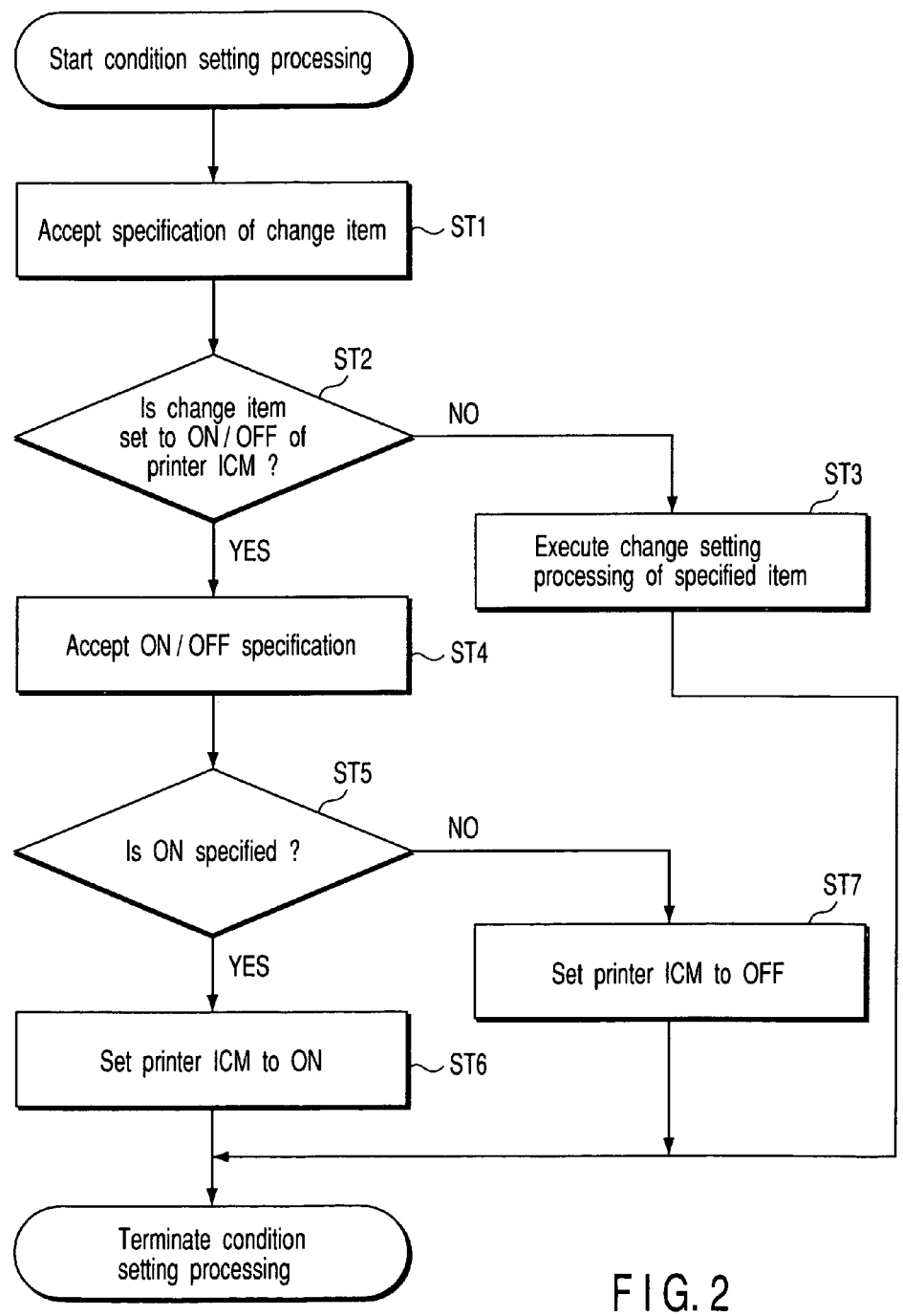
FIG. 2 is a flow chart showing condition setting processing executed by a CPU in FIG. 1.

If a user requests change of condition settings concerning the color printer in accordance with a predetermined instructive operation, the CPU 21 executes condition setting processing as shown in FIG. 2 based on the printer driver program 26b in response to such request.

In the condition setting processing, the printer driver first accept specification of a change item made by the user in accordance with a predetermined instructive operation using the keyboard/mouse 23 (step ST1). Then, the printer driver confirms whether the specified change item is set to ON/OFF of the printer ICM (step ST2).

If it is confirmed that an item other than ON/OFF of the printer ICM is specified as a change item, the printer driver carries out change setting processing concerning such specified item (step ST3). If such change setting processing has completed, condition setting processing is terminated.

In contrast, if it is confirmed that ON/OFF of the printer ICM is specified as a change item, the printer driver accepts specification of ON/OFF made by the user in accordance with a predetermined instructive operation using the keyboard/mouse 23 (step ST4), and confirms whether or not ON is specified (step ST5).

Then, if it is confirmed that ON of the printer ICM is specified, the printer driver sets the printer ICM to ON (step ST6). Alternatively, if it is confirmed that OFF of the printer ICM is specified, the printer ICM is set to OFF (step ST7).

In this way, the user setting of whether the printer ICM is set to ON or OFF is accepted and managed by the personal computer 2.

In the meantime, a part of the storage area of a main memory 22 is set at a management box 22a in accordance with processing based on the printer driver program 26b. When the CPU 21 operates as an application based on the application program 26a, if such application has an application ICM, ICM information indicating ON/OFF of the application ICM is written into the management box 22a.

Figures 3, 5:
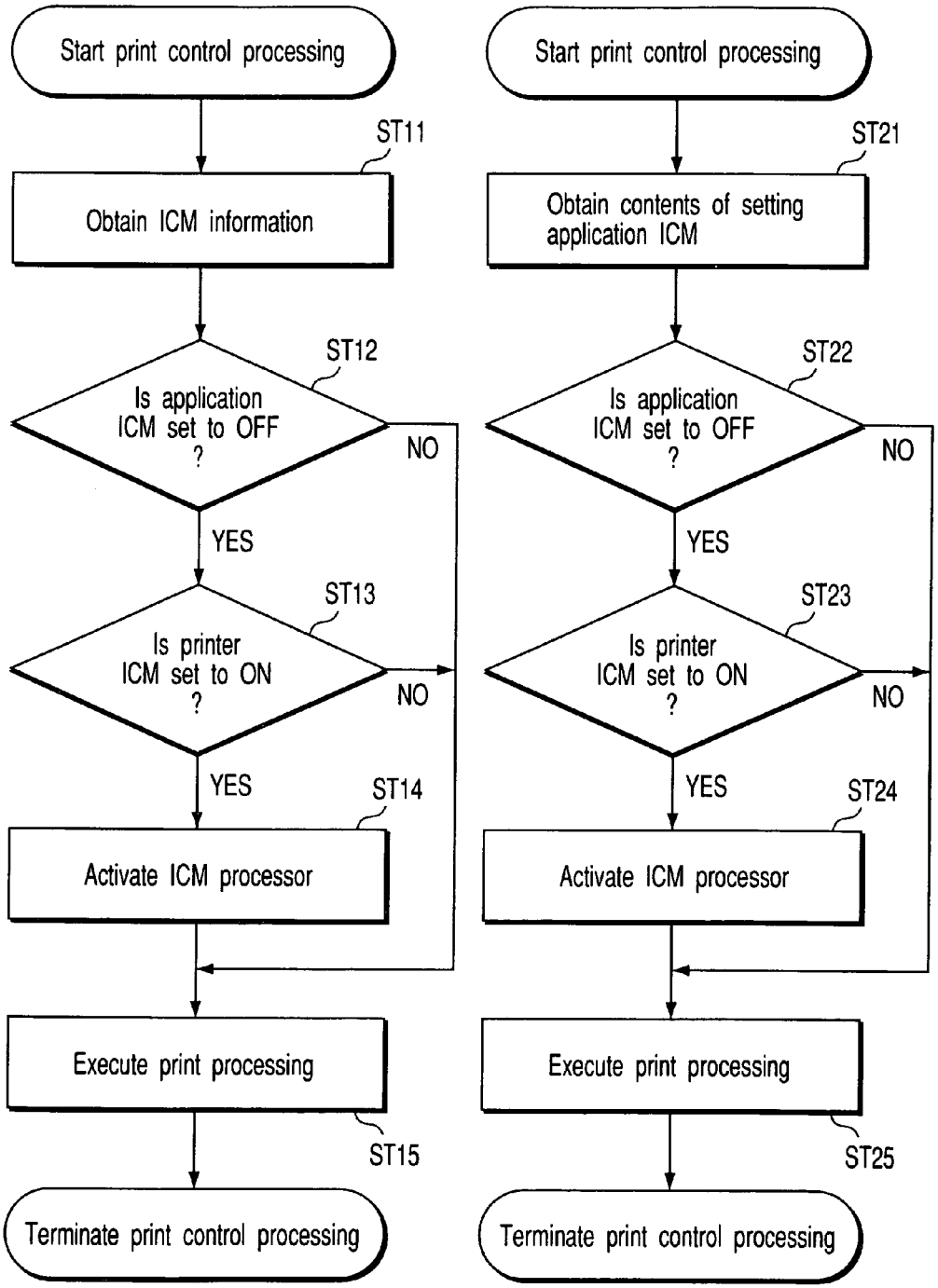
FIG. 3 is a flow chart showing print control processing executed by the CPU in FIG. 1.
FIG. 5 is a flow chart showing print control processing executed by the CPU in FIG. 4.

If a print request takes place at the application executed by the CPU 21, the CPU 21 executes print control processing as shown in FIG. 3 based on the printer driver program 26b.

In the print control processing, the printer driver first obtains the ICM information written in the management box 22a as described above (step ST11), and confirms whether or no, the application ICM is set to OFF based on the ICM information (step ST12).

If it is confirmed that the application ICM is set to OFF, the printer driver then confirms whether or not the printer ICM is set to ON (step ST13). If it is confirmed that the printer ICM is set to ON, the printer driver activates the ICM processor 15 of the color printer main body 1 (step ST14), and then, executes print processing according to a request from an application as well known (step ST15).

However, if it is confirmed that the application ICM is set to ON or that the printer ICM is set to OFF, the printer driver goes to the step ST15 at which print processing is executed without activating the ICM processor 15.

The ICM processor 15 executes the printer ICM only in the case where the section is activated by the printer driver.

In this way, only in the case where the application ICM is set to OFF, and the printer ICM is set to ON, the printer ICM is executed. The printer ICM is not executed under the other condition, i.e., under any of the conditions below.

(1) The application ICM is set to OFF, and the printer ICM is set to OFF;

(2) The application ICM is set to ON, and the printer ICM is set to ON; and (3) The application ICM is set to ON, and the printer ICM is set to OFF.

As has been described above, according to the present embodiment, if the printer driver confirms ON/OFF of the application ICM, and the application ICM is set to ON, even if the printer ICM is set to ON, the ICM processor 15 is not activated. Therefore, in the case where the application ICM is executed, the printer ICM is not executed. The ICM processing is prevented from carried out twice. As a result, a high-quality image to which ICM processing is suitably applied can be printed.

(Second Embodiment)

Figure 4:
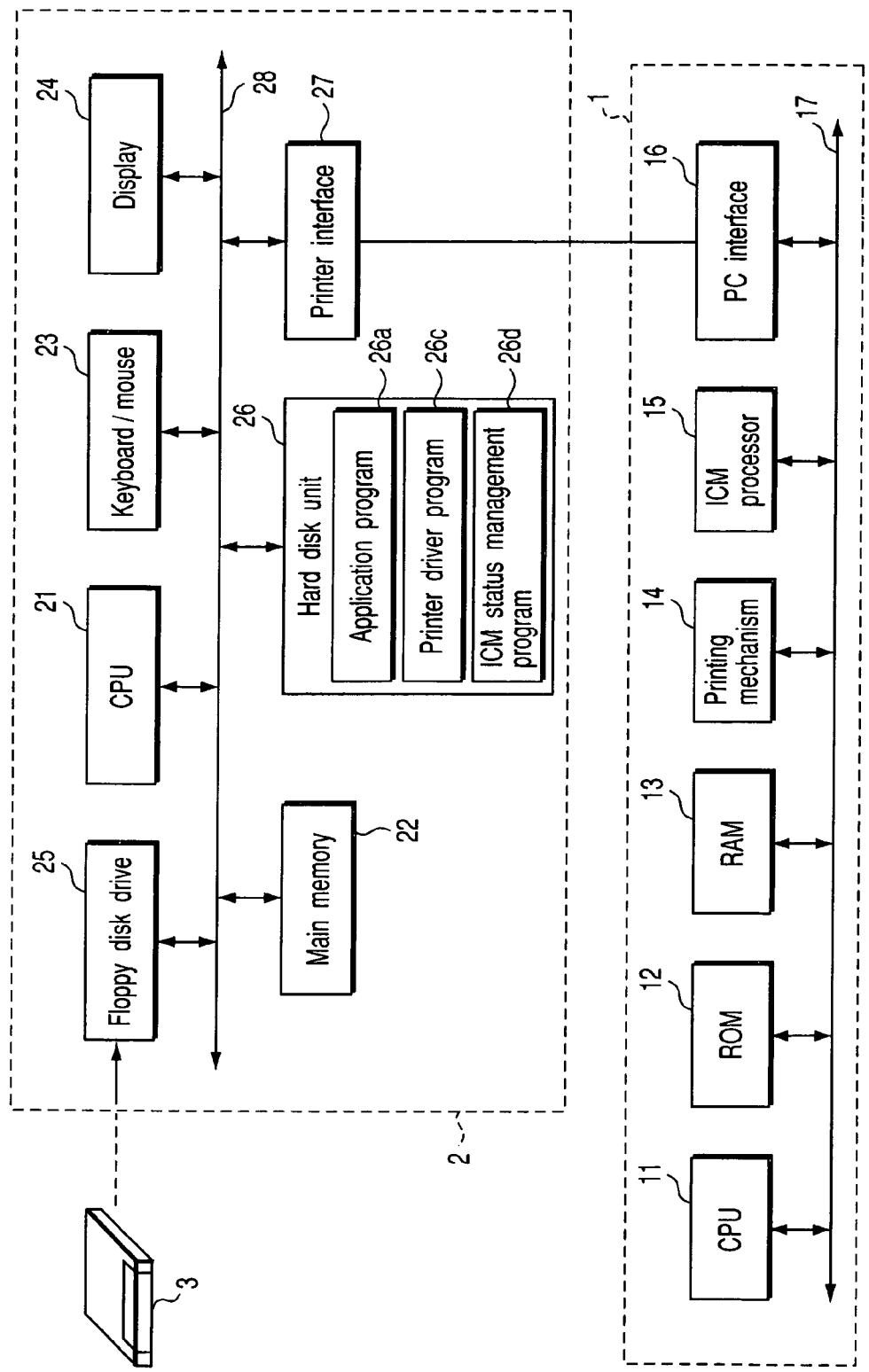
FIG. 4 is a block diagram showing a color printer according to a second embodiment of the present invention.

FIG. 4 is a block diagram showing a color printer according to a second embodiment of the present invention.

As shown in FIG. 4, the present embodiment is similar to the previously described first embodiment in hardware configuration. Therefore, a description of a hardware configuration is omitted here.

In the present embodiment, as part of a work for connecting the color printer to the personal computer 2, a printer driver program 26c and an ICM status management program 26d that are stored in the floppy disk 3 packed with or provided separately from the color printer main body 1 are installed in a hard disk unit 26.

The printer driver program 26c causes the CPU 21 to execute a respective one of the acceptance section and adjustment control section. These acceptance section and adjustment control sections are similar to those provided by the printer driver program 26b in the first embodiment.

The ICM status management program 26d monitors a variety of API functions the CPU 21 notifies to an operation system in accordance with processing based on the application program 26a from on the API functions, the program 26d determines whether the application ICM can be executed.

Now, an operation of the above described color printer will be described here. In the foregoing, the CPU 21 making operation based on the application program 26a is referred to as an application. The CPU 21 making operation based on the printer driver program 26c is referred to as a printer driver. Further, the CPU 21 making operation based on an ICM status management program 26d is referred to as an ICM status manager.

If the user request change of condition settings concerning the color printer in accordance with predetermined instructive operation using the keyboard/mouse 23, the CPU 21 executes condition setting processing completely identical to that according to the first embodiment based on the printer driver program 26c in response to such request. In this manner, the user setting of whether the printer ICM is set to ON or OFF is accepted and managed by the personal computer 2.

In the meantime, an application supplies a variety of API functions to an operation system as well known. Then, the ICM status manager monitors the API functions supplied from the application to the operation system and determines whether or not the application ICM is set to ON.

If a print request takes place at an application executed by the CPU 21, the CPU 21 executes print control processing as shown in FIG. 5 based on the printer driver program 26c.

In the print control processing, the printer driver first obtains the contents of setting the application ICM determined by the ICM status manager (step ST21), and confirms whether or not the application ICM is set to OFF (step ST22).

If it is confirmed that the application ICM is set to OFF, the printer driver then confirms whether or not the printer ICM is set to ON (step ST23). Then, if it is confirmed that the printer ICM is set to ON, the printer driver activates the ICM processor 15 of the color printer main body 1 (step ST24), and then, executes print processing according to a request from an application as well known (step ST25).

However, if it is confirmed that the application ICM is set to ON or that the printer ICM is set to OFF, the printer driver goes to the step ST25 at which print processing is executed without activating the ICM processor 15.

The ICM processor 15 executes the printer ICM only in the case where the section is activated by the printer driver.

In this way, only in the case where the application ICM is set to OFF, and the printer ICM is set to ON, the printer ICM is executed. The printer ICM is not executed under the other condition, i.e., under any of the conditions below.

(1) The application ICM is set to OFF, and the printer ICM is set to OFF;

(2) The application ICM is set to ON, and the printer ICM is set to ON; and (3) The application ICM is set to ON, and the printer ICM is set to OFF.

As has been described above, according to the present embodiment, if the printer driver confirms ON/OFF of the application ICM, and the application ICM is set to ON, even if the printer ICM is set to ON, the ICM processor 15 is not activated. Therefore, in the case where the application ICM is executed, the printer ICM is not executed. The ICM processing is prevented from carried out twice. As a result, a high-quality image to which ICM processing is suitably applied can be printed.

In addition, in the second embodiment, it is determined whether or not the application ICM is set to ON based on the API functions which the application outputs to the operation system as general processing. Thus, unlike the first embodiment, there is no need for the application to provide an additional function such as a function which writes ICM information into the management box 22a This makes it possible to properly set the printer ICM to ON/OFF relevant to many applications such as the existing applications, as described above.

The present invention is not limited to each of the foregoing embodiments. For example, although the foregoing embodiments each exemplify ICM as color adjustment processing, the present invention is applicable where another type of color adjustment processing is carried out.

In addition, although the foregoing embodiments each uses a floppy disk as a storage medium for delivering the printer driver programs 26b and 26c or ICM status management program 26d, CD-ROM or other storage media may be used.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A color printer that prints a color image according to a request from an application, said color printer comprising:
   an adjustment processing section configured to carry out color adjustment processing for adjusting a print color;
   an acceptance section configured to accept a user setting for indicating whether to activate the adjustment processing section;
   a determining section configured to determine whether the application is set to carry out color adjustment processing of the application; and
   an adjustment control section configured to (i) activate the adjustment processing section only if the determining section determines that the application is not set to carry out the color adjustment processing of the application, and if the acceptance section has accepted a user setting for activating the adjustment processing section, and (ii) deactivate the adjustment processing section in all other situations.

2. A color printer according to claim 1, wherein the application writes setting information indicating whether the application is set to carry out the color adjustment processing of the application in an information storage, and
   wherein the determining section determines whether the application is set to carry out the color adjustment processing of the application based on the setting information written into the information storage.

3. A color printer according to claim 1, wherein the application is provided by a computer executing an application program, and the application supplies an API (Application Program Interface) function indicating whether the application is set to carry out the color adjustment processing of the application to an operation system of the computer, and
   wherein the determining section obtains the API function from the operation system, and determines whether the application is set to carry out the color adjustment processing of the application based on the obtained API function.

4. A computer readable medium having stored thereon a driver program that causes a computer to execute control processing for printing a color image by a color printer in accordance with a request from an application achieved by the computer executing an application program, wherein the color printer comprises an adjustment processing section configured to carry out color adjustment processing for adjusting a print color, said driver program causing the computer to execute functions of:
   an acceptance section configured to accept a user setting for indicating whether to activate the adjustment processing section;
   a determining section configured to determine whether the application is set to carry out color adjustment processing of the application; and
   an adjustment control section configured to (i) activate the adjustment processing section only if the determining section determines that the application is not set to carry out the color adjustment processing of the application, and if the acceptance section has accented a user setting for activating the adjustment processing section, and (ii) deactivate the adjustment processing section in all other situations.

5. A method for driving a color printer in accordance with a request from an application achieved by a computer executing an application program, wherein the color printer comprises an adjustment processing section configured to carry out color adjustment processing for adjusting a print color, said driving method comprising:
   accepting a user setting for indicating whether to activate the adjustment processing section;
   determining whether the application is set to carry out color adjustment processing of the application;
   activating the adjustment processing section only if it is determined that the application is not set to carry out the color adjustment processing and if the user setting indicates that the color adjustment processing is to be activated, and deactivating the adjustment processing section in all other situations.

* * * * *